US010127218B2

United States Patent
Oleksy et al.

(10) Patent No.: US 10,127,218 B2
(45) Date of Patent: *Nov. 13, 2018

(54) OBJECT TEMPLATES FOR DATA-DRIVEN APPLICATIONS

(71) Applicant: Microsoft Technology Licensing, LLC, Redmond, WA (US)

(72) Inventors: Jakub M. Oleksy, Woodinville, WA (US); Bogdan Berce, Redmond, WA (US); Bradley M. Hammond, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 733 days.

This patent is subject to a terminal disclaimer.

(21) Appl. No.: 14/549,844

(22) Filed: Nov. 21, 2014

(65) Prior Publication Data
US 2015/0082138 A1 Mar. 19, 2015

Related U.S. Application Data

(63) Continuation of application No. 12/474,282, filed on May 29, 2009, now Pat. No. 8,918,709.

(51) Int. Cl.
*G06F 17/27* (2006.01)
*G06F 17/24* (2006.01)
(Continued)

(52) U.S. Cl.
CPC ........ *G06F 17/248* (2013.01); *G06F 3/04842* (2013.01); *G06F 8/315* (2013.01); *G06F 17/243* (2013.01)

(58) Field of Classification Search
CPC ......... G06F 17/30587; G06F 17/30575; G06F 17/30371; G06F 17/30607;
(Continued)

(56) References Cited

U.S. PATENT DOCUMENTS 5,694,598 A * 12/1997 Durand ............ G06F 17/30607
6,295,541 B1 * 9/2001 Bodnar ............ G06F 17/30353
(Continued)

FOREIGN PATENT DOCUMENTS

EP 1327941 A2 * 7/2003 ....... G06F 17/30569

OTHER PUBLICATIONS

Code Project, "Using Templates for Initialization", published: Feb. 13, 2001, pp. 1-18.*

*Primary Examiner* — Wilson W Tsui
(74) *Attorney, Agent, or Firm* — Liang IP, PLLC

(57) ABSTRACT

An object template system is described herein that allows an administrator of an IT management application to define templates that provide a streamlined mechanism for pre-populating IT objects with common values based on business logic and processes. The object template system addresses manipulation of objects both as part of a user interactive session as well as in programmatic workflows, while also allowing for referencing of existing objects to assume integrity of data. A metadata-driven schema allows for portable definitions of simple and complex extensible objects. The system validates these definitions against the extensible types that define the objects to ensure structural integrity. Users can then apply these definitions at runtime to both create and/or update simple and complex management objects. Thus, the object template system allows an administrator to define controlled processes for creating and modifying management objects within a flexible IT management application.

19 Claims, 3 Drawing Sheets

(51) Int. Cl.
*G06F 8/30* (2018.01)
*G06F 3/0484* (2013.01)

(58) Field of Classification Search
CPC .. G06F 17/30896; G06F 17/248; G06F 8/315; G06F 3/04842; G06F 17/243
See application file for complete search history.

(56) References Cited

U.S. PATENT DOCUMENTS

| | | | |
|---|---|---|---|
| 6,789,252 B1 | | 9/2004 | Burke et al. |
| 7,031,956 B1 | * | 4/2006 | Lee ................... G06F 17/30595 |
| 7,236,909 B1 | * | 6/2007 | Hoyos ..................... G06Q 10/00 |
| | | | 702/182 |
| 8,301,994 B1 | * | 10/2012 | Shah ................ G06F 17/30575 |
| | | | 715/229 |
| 8,874,614 B2 | * | 10/2014 | Patton ................... G06F 9/4425 |
| | | | 707/793 |
| 2003/0236577 A1 | | 12/2003 | Clinton |
| 2004/0015832 A1 | | 1/2004 | Stapp et al. |
| 2004/0162838 A1 | * | 8/2004 | Murayama ........ G06F 17/30607 |
| 2004/0199547 A1 | * | 10/2004 | Winter .............. G06F 17/30896 |
| 2005/0091223 A1 | | 4/2005 | Shaw et al. |
| 2005/0256852 A1 | * | 11/2005 | McNall ............ G06F 17/30398 |
| 2006/0206860 A1 | | 9/2006 | Dardinski et al. |
| 2006/0259911 A1 | | 11/2006 | Weinrich et al. |
| 2007/0038610 A1 | | 2/2007 | Omoigui |
| 2007/0100871 A1 | | 5/2007 | Clemm et al. |
| 2007/0136326 A1 | * | 6/2007 | McClement ........... G06Q 10/10 |

* cited by examiner

OBJECT TEMPLATES FOR DATA-DRIVEN APPLICATIONS

CROSS-REFERENCE TO RELATED APPLICATION(S)

This application is a continuation application of U.S. patent application Ser. No. 12/474,282, filed on May 29, 2009, the disclosure of which is incorporated herein in its entirety.

BACKGROUND

An information technology (IT) service desk functions as the main point of contact between end users and an IT organization or service provider. Often, the service desk's goal is to restore service to and to fulfill requests from users as quickly as possible. However, best practices suggest that the service desk be given a broader role—beyond that of the traditional Help Desk—a role that spans the processes of incident, problem, change, and asset and configuration management. Organizations looking to adopt this approach using traditional technologies face the realities that these technologies are often not flexible enough to meet their needs, lack integration across the rest of their systems management tools, and do not deliver process optimization to match their efforts in adopting best practice approaches. Newer applications and platforms, such as those offered by the Microsoft Operations Framework (MOF), seek to overcome these difficulties.

IT management applications, such as Microsoft System Center solutions, help organizations manage their IT environments, from physical to virtual, across desktops, devices, and datacenters. These applications are designed to provide a single window into IT services to allow proactive planning, deployment, management, and optimization across IT platforms. IT management applications capture and aggregate practical knowledge about infrastructure, policies, processes, and best practices so IT professionals can build manageable systems and automate operations to reduce costs, improve application availability, and enhance service delivery.

Because of the differences in various environments in which IT workers use IT management applications, IT management applications are often built as data-driven systems in which an IT manager defines various object types that have significance to the organization, roles for each object types, relationships between object types and so forth. For example, a service desk may have objects that represent service incidents, engineers in the service department, service contracts, and so forth. These objects may have relationships such as an "assigned to" relationship between a service incident and an engineer working on resolving the incident.

IT users in an IT organization often define new instances of objects and modify existing objects. For example, a service desk worker may open a new service incident that tracks the data associated with an issue that was submitted to the service desk. The service desk worker may also assign the incident to one or more engineers that will work on the incident, and associate the incident with a contract that defines the terms of a service agreement. These activities often involve customized business logic tailored to a particular organization and environment. Allowing users to quickly define simple and complex objects in management systems by starting with a common set of base values is usually expensive in implementation, and users spend time on this definition. Management objects are defined as complex hierarchal structures with intricate relationships between them that are difficult to maintain by end users. If an end user is given an unrestricted ability to create new objects, the user may not understand and adhere to all of the relationships that a particular organization has defined. For example, without some type of enforcement, a user could create an incident that was not assigned to anyone (e.g., lost in the system). The other alternative for organizations is to have custom code developed to carry out business logic, but this is expensive and approachable to a smaller audience.

SUMMARY

An object template system is described herein that allows an administrator or other user of an IT management application to define templates that provide a streamlined mechanism for pre-populating IT objects with common values based on business logic and processes. The object template system addresses manipulation of objects both as part of a user interactive session as well as in programmatic workflows, while also allowing for referencing of existing objects to assume integrity of data. A metadata-driven schema allows for portable definitions of simple and complex extensible objects. The system validates these definitions against the extensible types that define the objects to ensure structural integrity. Users can then apply these definitions at runtime to both create and/or update existing simple and complex management objects, while resolving to existing object instances, if applicable. Thus, the object template system allows an administrator to define controlled processes for creating and modifying management objects within a flexible IT management application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
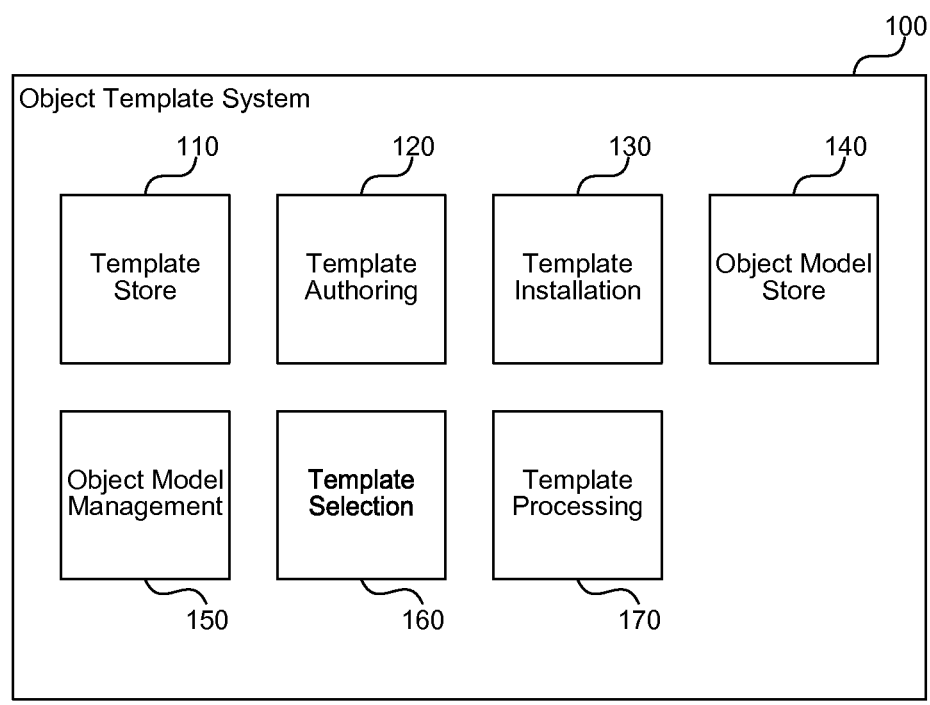
FIG. 1 is a block diagram that illustrates components of the object template system, in one embodiment.

An object template system is described herein that allows an administrator or other user of an IT management application to define templates that provide a streamlined mechanism for pre-populating IT objects with common values based on business logic and processes. The object template system addresses manipulation of objects both as part of a user interactive session as well as in programmatic workflows, while also allowing for referencing of existing objects to assume integrity of data. A metadata-driven schema allows for portable definitions of simple and complex extensible objects (e.g., object templates). The system validates these definitions against the extensible types that define the objects to ensure structural integrity. Users can then apply these definitions at runtime to both create and/or update existing simple and complex management objects, while resolving to existing instances when applicable and if available. For example, a template for creating a new support incident may pre-populate certain values (e.g., time received, creating user) and guide the user through filling in other values (e.g., assigned to, incident type).

The object template system can be used to provide templates for many types of object manipulation within an IT organization, including administrative tasks such creating users and groups, change management activities such as creating and monitoring the progress of requests, creating and viewing configuration items (CIs), editing incident notification templates or workflows, creating and editing incidents and problem workflow, and so forth. The system allows templates to be created by administrators in a particular organization as well as for common templates to be delivered by a third party in the form of a management pack that installs the templates into the data-driven model of a particular organization. Thus, the object template system allows an administrator to define controlled processes for creating and modifying management objects within a flexible IT management application.

The object templates allow administrators to control the creation of complex management objects by users. When the object templates resolve to existing referenced objects at runtime, the system refers to those objects instead of overwriting them. The definitions of the object templates are portable and defined with respect to and validated against the hierarchal type definitions of the management objects. Validation of the object templates is accomplished by creating an instance of the object while offline and mimicking an online environment as part of the validation process to ensure that the object template produces valid objects. Referential integrity is maintained between the object templates and the types that define the objects. Values used within the object templates are validated against constraints of the types of the objects. Object templates can be used both for creation of new objects as well as changing of existing objects. Object template processing allows for extensible handling of template values through a callback mechanism. These and other features of the system are described in further detail herein.

FIG. 1 is a block diagram that illustrates components of the object template system, in one embodiment. The system 100 includes a template store 110, a template-authoring component 120, a template installation component 130, an object model store 140, an object model management component 150, a template selection component 160, and a template-processing component 170. Each of these components is described in further detail herein.

The template store 110 is a data store that provides persistent storage for object templates. The template store 110 may include a database, file system, storage area network (SAN), or other storage paradigm for persisting data. The template store may be integrated with the object model store 140, such as in a separate database table. The template store may be populated by an administrator authoring new templates using the template-authoring component 120, or by other methods, such as applying pre-built templates in a management pack. A management pack is a form of portable template store 110 that may be transferred between instances of the system 100.

The template-authoring component 120 allows a template author to define an object template through a user interface. The template-authoring component may include a custom user interface that displays a blank form for an object type for which a template author wants to create an object template. The template author can define properties of the object type arbitrarily deep by drilling down into sub-objects of the provided form and filling in property values to be applied by the template. The template-authoring component 120 may also allow a template author to define a template manually, such as by editing an extensible markup language (XML) file in a text or XML editor. Templates can be expressed as hierarchical XML schemas. In some embodiments, the template authoring component 120 outputs a management pack that the template author or an administrator can apply to one or more installations of the object template system 100. The template-authoring component 120 may also store authored templates directly in the template store 110.

The template installation component 130 provides a process for installing new templates to a management application object model. The template installation component 130 may receive a management pack or other packaged format that stores templates and install the pack by storing the contents in the template store 110. The installation process may include validating the template against object types already defined.

The object model store 140 stores object types, instances, and relationships for a particular installation of a management application. In some embodiments, the object model store 140 and template store 110 may be a single data store. The object model store 140 may include various types of storage devices and paradigms, including databases, file systems, cloud-based storage, and so forth. The object model store 140 persists the data that defines an object model for a particular data-driven application.

The object model management component 150 maintains an in-memory model of an object model stored by the object model store 140. The object model management component 150 provides the functions of the management application defined by the object model. The component 150 may receive and process requests to modify the object model and persist changes to the model to the object model store 140. The component 150 may also provide an application-programming interface (API) for manipulating the object model programmatically, so that other applications can interact with the management application.

The template selection component 160 receives a selection of a template from a user that the user wants to apply to an object instance. For example, a management application may provide a user interface for listing objects, selecting objects, and modifying objects. When a user is viewing a particular object, the management application may provide a menu of templates that the user can apply to the displayed object to modify the object. In addition, the management application may provide menu options or other controls for creating new objects and a particular control may apply a particular template to create an object. An administrator may periodically add new templates to the template store 110 and the application may periodically enumerate the templates in the template store to determine the options provided to the user. Those of ordinary skill in the art will recognize this and other techniques that can be used by the system 100 that are common to data-driven applications.

The template-processing component 170 applies a selected template to create a new object instance or modify an existing object instance. The template-processing component 170 receives a selected template from the template selection component 160, loads the template, and applies the properties and relationships set in the template to create a new object instance or modify an existing object instance. If an object instance is selected when a user requests to apply the selected template, then the component 170 applies the selected template to the selected object instance to update the object instance's properties in accordance with the values of the template. Where existing property values conflict with those of the template, the template may define whether the template overwrites the values of the object instance or allows the user to select a resolution to the conflict.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Typically, a user of the object template system begins by defining object templates with respect to the structure of the objects the user wants to create and/or update. These definitions may be stored in management packs (portable XML-based management related objects) alongside the specific type definitions they use. However, type definitions and object templates do not need to be in the same management pack.

Definitions can either by simple, in that they interact with a single type. In the following example XML, the template interacts with a type "FooLibrary.Bleh" and applies various properties, such as an identifier (ID), description, count, and enumeration.

```
<ObjectTemplate ID="MyTemplate" TypeID="FooLibrary.Bleh" >
    <Property Path="$Target/Property[Type='FooLibrary.Bleh']/
        BlehId$">test string</Property>
    <Property Path="$Target/Property[Type='FooLibrary.Bleh']/
        BlehDescription$">Some other test</Property>
    <Property Path="$Target/Property[Type='FooLibrary.Bleh']/
        BlehCount$">37</Property>
    <Property Path="$Target/Property[Type='FooLibrary.Bleh']/
        BlehEnum$">$MPElement[Name='Fruit.Cherry']$</Property>
</ObjectTemplate>
```

Object template definitions may also specify more complex, hierarchical relationships between object types. In the following example XML, the "Bleh" type in the previous example is associated with zero or more sub-objects, including a "MiniBleh" subtype, which has its own "MicroBleh" subtype. Each of these objects has its own properties set by the template, such as a description, address, and so forth. When a user applies the template to create or modify a "Bleh" object, the object template system updates each of the properties in the template according to the hierarchy provided in the template. For example, the template may set the properties of any "MiniBleh" sub-objects to the values defined in the template.

```
<ObjectTemplate ID="MyOtherTemplate" TypeID="FooLibrary.Projection">
    <Property Path="$Target/Property[Type='FooLibrary.Bleh']/
        BlehId$">test string</Property>
    <Property Path="$Target/Property[Type='FooLibrary.Bleh']/
        BlehDescription$">Some other test</Property>
    <Property Path="$Target/Property[Type='FooLibrary.Bleh']/
        BlehCount$">37</Property>
    <Property Path="$Target/Property[Type='FooLibrary.Bleh']/
        BlehEnum$">$MPElement[Name='Fruit.Cherry']$</Property>
    <Object Path="$Target/Path[Relationship=
        'FooLibrary.HasMiniBlehs' SeedRole='Source'
        TypeConstraint='FooLibrary.MiniBleh']$">
        <Property Path="$Target/Property[Type='FooLibrary.Bleh']/
            BlehId$">test string</Property>
        <Property Path="$Target/Property[Type=
            'FooLibrary.MiniBleh']/MiniId$">420</Property>
        <Property Path="$Target/Property[Type='
            FooLibrary.MiniBleh']/MiniAddress$">santa@north.pole.net
        </Property>
        <Object Path="$Target/Path[Relationship=
            'FooLibrary.HasMicroBlehs' SeedRole='Source'
            TypeConstraint='FooLibrary.MicroBleh']$">
            <Property Path="$Target/Property[Type=
                'FooLibrary.MiniBleh']/MiniId$">420</Property>
            <Property Path="$Target/Property[Type=
                'FooLibrary.MicroBleh']/MicroId$">1</Property>
            <Property Path="$Target/Property[Type=
                'FooLibrary.MicroBleh']/MicroBleh$">bbb</Property>
        </Object>
```

```
    <Object Path="$Target/Path[Relationship=
      'FooLibrary.HasMicroBlehs' SeedRole='Source'
      TypeConstraint='FooLibrary.MicroBleh']$">
      <Property Path="$Target/Property[Type=
        'FooLibrary.Bleh']/BlehId$">test string</Property>
      <Property Path="$Target/Property[Type=
        'FooLibrary.MicroBleh']/MicroId$">2</Property>
      <Property Path="$Target/Property[Type=
        'FooLibrary.MicroBleh']/MicroBleh$">ccc</Property>
    </Object>
  </Object>
  <Object Path="$Target/Path[Relationship=
    'FooLibrary.HasMiniBlehs' SeedRole='Source'
    TypeConstraint='FooLibrary.MiniBleh']$">
    <Property Path="$Target/Property[Type=
      'FooLibrary.MiniBleh']/MiniId$">400</Property>
    <Property Path="$Target/Property[Type=
      'FooLibrary.MiniBleh']/MiniAddress$">atnas@south.pole.net
    </Property>
  </Object>
</ObjectTemplate>
```

In both examples, the object template system validates all components of the object template against related type definitions. The system resolves the "$Target/*" notation in context and the values used are applied at verification time in a virtual online environment to ensure created objects are valid. The complex definition shown above actually creates a three level deep hierarchy and at each level the key values of the host do not need to be explicitly populated, instead they are inferred from the parent object.

If the templates refer to existing objects through reference relationships, rather than overwriting the existing instances the system uses the existing instances and creates a relationship to them during the template application process. This allows users to refer to instances they do not know to exist, without worry of overwriting such instances with some default values if they are. For example, the user may not want to overwrite an "assigned to" property of a service incident.

Figure 2:
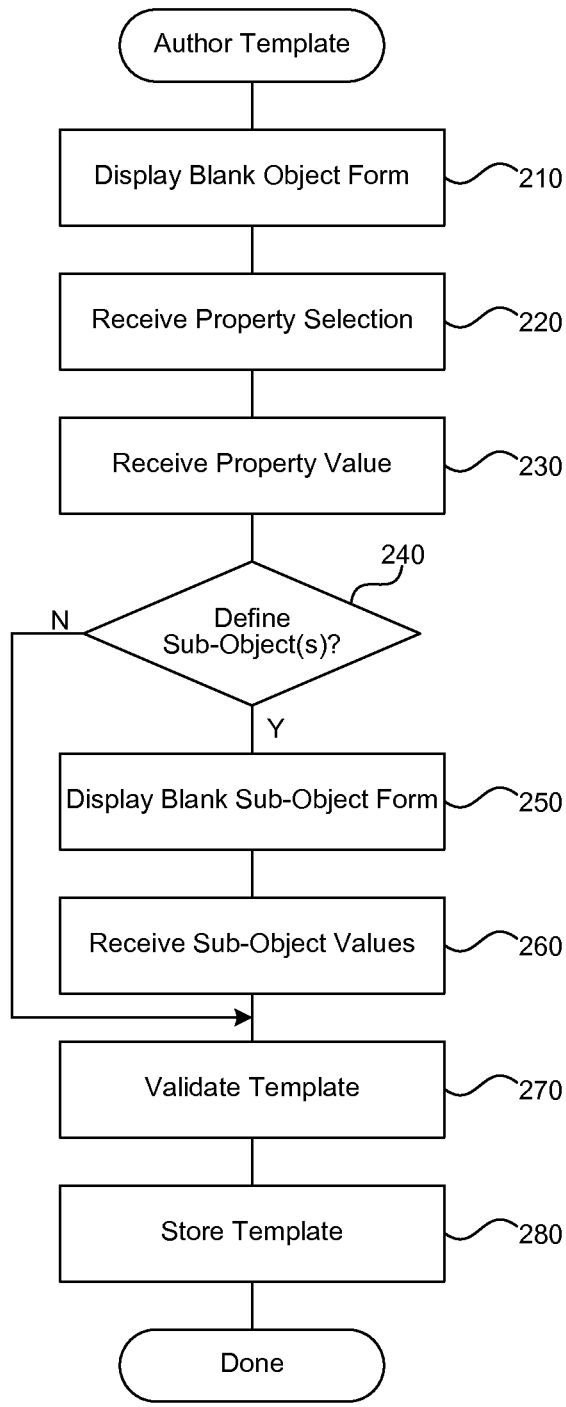
FIG. 2 is a flow diagram that illustrates the processing of the template-authoring component of the object template system to define a new object template, in one embodiment.

FIG. 2 is a flow diagram that illustrates the processing of the template-authoring component of the object template system to define a new object template, in one embodiment. These steps are typically invoked by an administrator or third party tasked with codifying business logic and workflows into one or more templates for an organization. Beginning in block 210, the component displays a blank form for a type of object for which the author is creating a template. The system may offer the author a list of object types to for which the author can create templates. For example, a service desk application may include an incident object that the author selects to create a template that assigns the incident to a user. During assignment, the author may want users to type a note into a text field, change an assignment field to a user's name, change a status field to "assigned," and record a time/date of assignment.

Continuing in block 220, the component receives from the author a selection of at least one property for which the author wants the template to set or modify the value. In the previous example, the author may select the status field to specify the new status value that the component will assign to an object to which a user applies the template. Continuing in block 230, the component receives a value for the selected property. In the previous example of a status field, the component may provide a dropdown list of enumeration values that are valid for the status field, and the author may select one of the values to associate with the template. The author may repeat the steps illustrated in blocks 220 and 230 for many different properties, depending on the complexity and purpose of the template.

Continuing in decision block 240, if the author indicates one or more sub-objects for which the author wants to specify values associated with the template, then the component continues at block 250, else the component jumps to block 270. For example, for an incident object related to a service desk, an "assigned to" property may include a reference to one or more user objects that indicate a user or users of the system to which the incident is currently assigned. A particular user may have a template for incidents that assigns the incidents to the user, so the user may want the template to include updating the assigned to field to refer to the user as well as modifying properties of the user's user object. For example, the user object may include an assignment count, time of last assignment, and so forth, each of which are modified by the single act of applying the assignment template.

Continuing in block 250, the component displays a blank form for modifying a sub-object of the originally selected object. The form may include all of the modifiable fields of the object. The component may provide lists of valid values, such as names of users that are stored within the system for a user object, so that the template author can select a pre-validated value for a particular field. Continuing in block 260, the component receives one or more sub-object field values from the template author based on the purpose of the template. In the previous example where the purpose of the template is to assign an incident object to a particular user, the author may fill in a name or identifier for a user sub-object of an incident object to have a particular value for the user to which the template assigns incidents when applied. In some embodiments, the system may provide well-known replacement values, such as a value "current user" that allows the template to be used by many users. When a user applies the template, the system can fill in an appropriate replacement value at runtime based on the identity of the user applying the template.

Continuing in block 270, the component validates the values provided by the author for the template to insure structural and referential integrity with any rules of the object model associated with the template. For example, the object model may specify data types, minimum/maximum values, and other restrictions for certain properties, and the component ensures that the template is valid based on the object model. In some embodiments, some or all of the validation cannot be performed when the template is authored and is instead performed when the template is installed based on the object model to which the installation is applied. Continuing in block 280, the component stores the template in a template store for later use. The component may store the template in a management pack that is a distributable and installable set of one or more templates. Administrators of instances of the system can install management packs tailored for their use of the system. Because a template has referential integrity with the object model once installed, administrators cannot remove object types without removing any templates associated with them. After block 280, these steps conclude.

Figure 3:
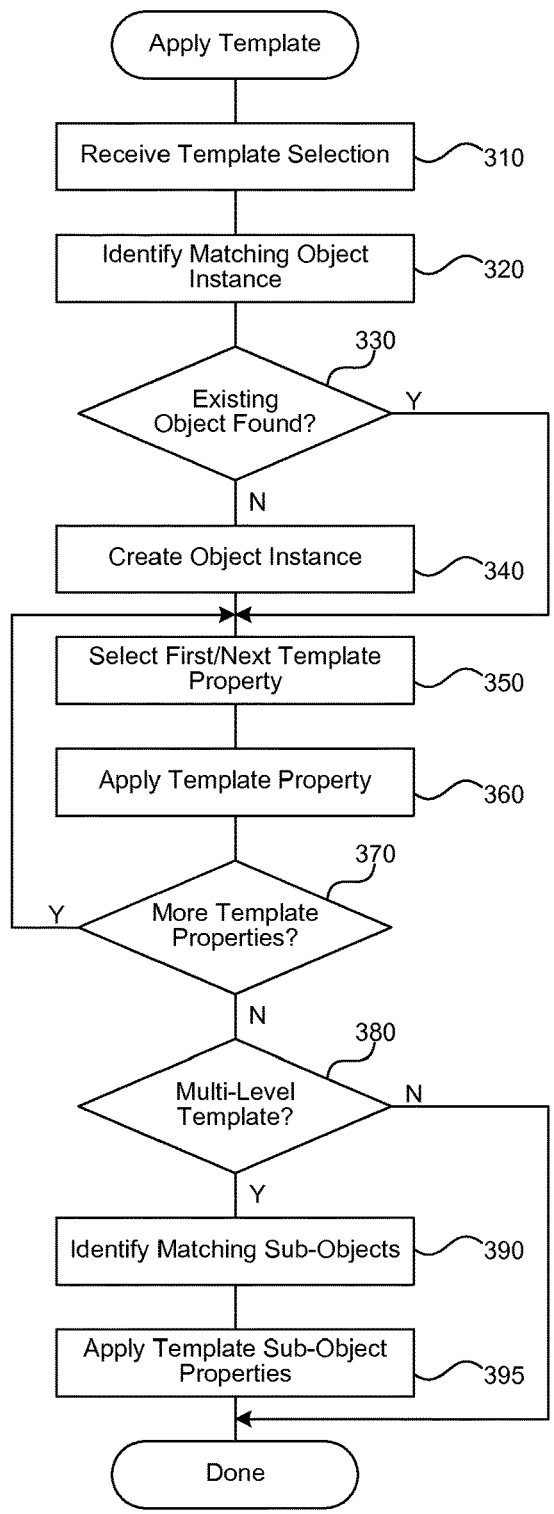
FIG. 3 is a flow diagram that illustrates the processing of the template-processing component of the object template system to apply a template to one or more objects, in one embodiment.

FIG. 3 is a flow diagram that illustrates the processing of the template-processing component of the object template system to apply a template to one or more objects, in one embodiment. These steps may be invoked, for example, by an end user of a data-driven management application to modify objects of a data-driven object model to carry out business processes. Beginning in block 310, the component receives from a user a template selection identifying a template to apply. The user may view a form related to an object in a user interface, and the user interface may include controls, such as a menu, for selecting templates to apply to the object. For example, for a support incident object, the system may include templates for assigning the support incident to the user, resolving the incident, and so forth.

Continuing in block 320, the component searches for an object instance that matches the template. Some templates are authored to create object instances, while others are authored to modify existing object instances. In some cases, a template author may create a template that serves both purposes. The system first looks for a matching object instance and if none is found creates a new object instance to which to apply the template. Continuing in decision block 330, if the component identified a matching object instance, then the component jumps to block 350, else the component continues at block 340. Continuing in block 340, the component creates a new object instance of a type associated with the selected template. When the component does not find an existing object instance, the component creates a new one. The template may provide initial values for various properties of the new object instance.

Continuing in block 350, the component selects the first template property. For example, the template may set one or more properties of the object type with which it the template associated. Continuing in block 360, the component applies the selected template property to the object instance that was created or identified by the search. The system may apply the template property by overwriting or setting any existing value for the property of the object identified by the template. The template may identify values for some properties and not others, leaving the values of properties not identified by the template with the value that existed before applying the template. Thus, a template can perform an operation that is surgical or very comprehensive, depending on the purpose of the template author. Continuing in decision block 370, if the template includes more properties, then the component loops to block 350 to select the next template property, else the component continues at block 380.

Continuing in decision block 380, if the template includes multiple hierarchical levels of objects, then the component continues at block 390, else the component completes. For example, the template may include property values for the component to set on sub-objects of the main object. Continuing in block 390, the component identifies any sub-objects that match a subject-pattern described in the template. For example, the template may identify a sub-object by name or by type, and the component identifies sub-objects having the specified name or type. When none is found, the component may create a sub-object of the specified type and apply the properties specified in the template to the sub-object. Continuing in block 395, the component applies properties of the sub-object specified in the template to the identified or created sub-objects. For example, an incident assignment template may define a user sub-object to which to assign the incident. When the component is finished applying the template, the component may return control to the user interface of the management application and display the modified object to the user. After block 395, these steps conclude.

In some embodiments, the object template system provides an API through which other applications can invoke the system programmatically. Applications can use object templates to create both simple (CreatableEnterpriseManagementObject) and complex (EnterpriseManagementObjectProjection) management objects programmatically. Following are example API definitions for creating management objects.

```
public CreatableEnterpriseManagementObject(
    EnterpriseManagementGroup managementGroup,
    ManagementPackObjectTemplate template);
public CreatableEnterpriseManagementObject(
    EnterpriseManagementGroup managementGroup,
    ManagementPackObjectTemplate template,
    ObjectTemplateCallback callback);
public EnterpriseManagementObjectProjection(
    EnterpriseManagementGroup managementGroup,
    ManagementPackObjectTemplate template);
public EnterpriseManagementObjectProjection(
    EnterpriseManagementGroup managementGroup,
    ManagementPackObjectTemplate template,
    ObjectTemplateCallback callback);
```

Applications can also apply object templates to existing simple and complex objects by a simple method on each. Following are example API definitions for applying templates.

```
public void ApplyTemplate(
    ManagementPackObjectTemplate template,
    ObjectTemplateCallback callback);
public void ApplyTemplate(
    ManagementPackObjectTemplate template);
```

In some embodiments, the object template system allows applications to provide a callback function to perform more advanced template processing. In both examples API definitions above a callback is optional. The default implementation of the callback sets the value to the object, but callers can use this mechanism to perform complex value replacement based on custom business logic. Following is an example API definition for a callback function that the system invokes when a template is applied so that the application can perform other processing.

```
public delegate void ObjectTemplateCallback(
    EnterpriseManagementSimpleObject simpleObject,
    object value);
```

In some embodiments, the object template system supports locking down object types so that users can only create instances of those types using a specified template. Restricting object instance creation enforces the business logic of a particular organization so that all object instances conform to a known set of parameters. Templates may provide well-defined processes for creating, updating, and deleting objects of a particular type.

In some embodiments, the object template system maintains an audit trail of template application. For example, an audit log may log each object creation or modification and any template that was involved in the action. For example, if the user selects an object instance and applies a template to modify the instance, the system may add an entry to the audit log with a template identifier, object identifier, and other information to allow an administrator to review the action. This may allow debugging when a template is allowing bad values to be entered for an object or verification of who is using templates and how they are being used.

From the foregoing, it will be appreciated that specific embodiments of the object template system have been described herein for purposes of illustration, but that various modifications may be made without deviating from the spirit and scope of the invention. For example, although IT incident management has been used in examples, the system can be applied to many types of data-driven applications for a variety of purposes. Accordingly, the invention is not limited except as by the appended claims.

We claim:

1. A method for setting one or more properties of multiple instances of an object, the method performed by a computing device having a processor, the method comprising:
with the processor,
receiving from a user a selection identifying a template to apply to an object instance of an object of an object type, wherein the template sets one or more properties and corresponding template property values of the object instance of the object type; and
in response to receiving the template selection,
searching for the object instance that matches the object type of the selected template; and
applying the selected template to the matched object instance of the object type, including:
determining whether the template includes multiple levels of sub-objects; and
in response to determining that the template includes multiple levels of sub-objects,
determining whether a sub-object of the matched object instance that matches a hierarchical pattern of the selected template already exists in the matched object instance; and
in response to determining that the sub-object of the matched object instance does not exist, creating a sub-object in the matched object instance according to the hierarchical pattern of the selected template and applying a template property and a corresponding template property value to the created sub-object according to the selected template.

2. The method of claim 1 wherein the method is invoked by an end user of a data-driven management application to modify objects of a data-driven object model to carry out business processes.

3. The method of claim 1 wherein receiving a template selection comprises displaying a form related to an object in a user interface, wherein the user interface includes controls for selecting one or more templates to apply to the object.

4. The method of claim 1 further comprising, in response to receiving the template selection, creating a new object instance of the object type associated with the selected template when no object instance that matches the object type of the selected template is found during the searching.

5. The method of claim 1 wherein the template is defined as a series of hierarchical sub-objects, and the method further comprises enumerating the hierarchical sub-objects of the matched object instance.

6. The method of claim 1 wherein applying the template property value comprises overwriting an existing sub-object property value of the matched object instance with the template property value.

7. The method of claim 1 wherein determining whether the template includes multiple levels of sub-objects comprises navigating a hierarchy of the template and identifying the sub-objects of a main object within the matched object instance.

8. The method of claim 1 wherein in response to determining that the sub-object of the matched object instance exists, applying the template property and the corresponding template property value to the sub-object according to the selected template.

9. The method of claim 1 further comprising, after applying the selected template property, returning control to a user interface of a management application and displaying the modified object to the user.

10. A computer system, comprising:
a processor and a memory containing instructions executable by the processor to cause the computer system to:
receive from a user a selection identifying a template to apply to an object instance of an object of an object type, wherein the template sets one or more properties and corresponding template property values of the object instance of the object type; and
in response to receiving the template selection,
search for the object instance that matches the object type of the selected template; and
apply the selected template to the matched object instance of the object type, including to:
determine whether the template includes multiple levels of sub-objects; and
in response to determining that the template includes multiple levels of sub-objects,
determine whether a sub-object of the matched object instance that matches a hierarchical pattern of the selected template already exists in the matched object instance; and
in response to determining that the sub-object of the matched object instance does not exist, create a sub-object in the matched object instance according to the hierarchical pattern of the selected template and applying a template property and a corresponding template property value to the created sub-object according to the selected template.

11. The computer system of claim 10 wherein the memory contains additional instructions executable by the processor to cause the computer system to, in response to receiving the template selection, create the object instance of the object type associated with the selected template when no object instance that matches the object type of the selected template is found during the searching.

12. The computer system of claim 10 wherein the memory contains additional instructions executable by the processor to cause the computer system to enumerate the hierarchical sub-objects of the matched object instance in response to receiving, from the user, the template selection.

13. The computer system of claim 10 wherein to apply the template property includes to overwrite an existing sub-object property value of the matched object instance with the template property value.

14. The method of claim 10 wherein the memory contains additional instructions executable by the processor to cause the computer system to display a form related to an object in a user interface, wherein the user interface includes controls for selecting one or more templates to apply to the object.

15. A method for setting one or more properties of multiple instances of an object, the method performed by a computing device having a processor, the method comprising:

upon receiving, from a user, a selection identifying a template to apply to one or more objection instances of an object of an object type,
searching for the one or more object instances that match the object type of the selected template; and
applying the selected template to each of the matched one or more object instances of the object type, including:
determining whether the template includes multiple levels of sub-objects; and
in response to determining that the template includes multiple levels of sub-objects,
determining whether a sub-object of the matched object instance that matches a hierarchical pattern of the selected template already exists in the matched object instance; and
in response to determining that the sub-object of the matched object instance does not exist, creating a sub-object in the matched object instance according to the hierarchical pattern of the selected template and applying a template property and a corresponding template property value to the created sub-object according to the selected template.

16. The method of claim 15, further comprising, in response to receiving the selection of the template when no object instance that matches the object type of the selected template is found during the searching.

17. The method of claim 15, further comprising, in response to receiving the selection of the template when no object instance that matches the object type of the selected template is found during the searching and applying one or more property and property values to the created another object instance.

18. The method of claim 15 wherein applying the template property value comprises overwriting an existing sub-object property value of the matched object instance with the template property value.

19. The method of claim 15, further comprising enumerating the hierarchical sub-objects of the matched object instance in response to receiving, from the user, the template selection.

\* \* \* \* \*